(12) United States Patent
Tang et al.

(10) Patent No.: US 11,379,792 B2
(45) Date of Patent: Jul. 5, 2022

(54) INVENTORY MANAGEMENT SERVER

(71) Applicant: MasterCard Asia/Pacific Pte. Ltd., Singapore (SG)

(72) Inventors: Hao Tang, Singapore (SG); Senxian Zhuo, Singapore (SG); Xijing Wang, Singapore (SG); Bensam Joyson, Singapore (SG); Naman Aggarwal, Singapore (SG); Donghao Huang, Singapore (SG); Prashant Sridhar, Pyrmont (AU); Martin Collings, Blakehurst (AU); Perry Kick, Parkdale (AU)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 342 days.

(21) Appl. No.: 15/624,999

(22) Filed: Jun. 16, 2017

(65) Prior Publication Data
US 2017/0372264 A1    Dec. 28, 2017

(30) Foreign Application Priority Data
Jun. 27, 2016  (SG) .......................... 10201605283Y

(51) Int. Cl.
*G06Q 10/08* (2012.01)
*G06Q 20/20* (2012.01)

(52) U.S. Cl.
CPC ....... *G06Q 10/0875* (2013.01); *G06Q 20/202* (2013.01); *G06Q 20/203* (2013.01); *G06Q 20/208* (2013.01)

(58) Field of Classification Search
CPC ............. G06Q 10/0875; G06Q 20/202; G06Q 20/203; G06Q 20/208
See application file for complete search history.

(56) References Cited

U.S. PATENT DOCUMENTS

| 8,078,506 B1* | 12/2011 | Rao ................. | H04N 21/43637 705/27.2 |
| 8,335,720 B2* | 12/2012 | Juang ................. | G06Q 30/0202 705/14.53 |
| 8,364,547 B2* | 1/2013 | Metzger ............... | G06Q 10/087 705/26.1 |

(Continued)

FOREIGN PATENT DOCUMENTS

WO    2016077596 A1    5/2016

OTHER PUBLICATIONS

PCT International Search Report and Written Opinion, Application No. PCT/SG2017/050289, dated Jul. 13, 2017, 12 pps.

*Primary Examiner* — Peter Ludwig
*Assistant Examiner* — Michael Jared Walker
(74) *Attorney, Agent, or Firm* — Armstrong Teasdale LLP

(57) ABSTRACT

An inventory management server is provided. The inventory management server includes at least one processor, and at least one memory. The at least one memory includes computer program code configured to cause the inventory management server at least to receive tracking data assigned to a product from a payment network, interrogate a mapping table containing assigned product to tracking data information, for the presence of the received tracking data, update an inventory database of the product stocked at the merchant inventory in response to detection of the presence of the received tracking data, and transmit acknowledgement data indicative of the inventory database update. The tracking data is transmitted by a merchant via a payment terminal in communication with the payment network.

20 Claims, 4 Drawing Sheets

(56) References Cited

U.S. PATENT DOCUMENTS

| | | | |
|---|---|---|---|
| 8,751,337 B2* | 6/2014 | Hahn-Carlson | G06Q 20/102 705/30 |
| 9,026,457 B2 | 5/2015 | Juang et al. | |
| 9,280,751 B2* | 3/2016 | Smith | G06Q 10/02 |
| 9,665,855 B2 | 5/2017 | Brooks et al. | |
| 2003/0212614 A1* | 11/2003 | Chu | G06Q 10/08 705/28 |
| 2003/0236755 A1* | 12/2003 | Dagelet, Jr. | G07G 1/14 705/68 |
| 2004/0186760 A1* | 9/2004 | Metzger | G07F 7/0886 705/28 |
| 2007/0055586 A1* | 3/2007 | Lucas | G06Q 10/06 705/28 |
| 2008/0103914 A1* | 5/2008 | Hussain | G06Q 10/087 705/26.1 |
| 2008/0177638 A1* | 7/2008 | Butler | H04L 67/1095 705/26.41 |
| 2009/0177563 A1* | 7/2009 | Bernstein | G06Q 20/04 705/30 |
| 2009/0259569 A1* | 10/2009 | Narea | G06Q 10/087 705/28 |
| 2011/0313926 A1* | 12/2011 | Templeton | G06Q 20/10 705/44 |
| 2012/0209734 A1* | 8/2012 | Brooks | G06Q 10/0875 705/23 |
| 2012/0278205 A1* | 11/2012 | Chin | G06Q 10/087 705/28 |
| 2013/0013371 A1* | 1/2013 | Katsakhyan | G06Q 30/02 705/7.29 |
| 2013/0275242 A1* | 10/2013 | Ramaratnam | G06Q 20/203 705/21 |
| 2014/0067681 A1 | 3/2014 | Brooks et al. | |
| 2014/0156472 A1* | 6/2014 | Stuntebeck | G06Q 10/087 705/28 |
| 2014/0258051 A1* | 9/2014 | Bostwick | G06Q 10/087 705/28 |
| 2014/0304096 A1* | 10/2014 | Devineni | G06Q 10/087 705/22 |
| 2015/0220989 A1* | 8/2015 | Hayes | G06Q 30/0261 705/14.35 |
| 2016/0034876 A1* | 2/2016 | Speiser | G06Q 20/223 705/21 |
| 2016/0247219 A1* | 8/2016 | Sorensen | G06F 16/9537 |
| 2016/0358122 A1* | 12/2016 | Tiwary | G06Q 10/087 |

* cited by examiner

INVENTORY MANAGEMENT SERVER

CROSS REFERENCE TO RELATED APPLICATIONS

This application claims the benefit and priority of Singapore Patent Application No. 10201605283Y, filed on Jun. 27, 2016, the entire content of which is incorporated by reference herein in its entirety as part of the present application.

BACKGROUND

The following discloses a method and server for facilitating inventory management. Also disclosed is a merchant terminal for facilitating inventory management.

When managing the flow of goods, factors like movement and storage of work-in-process inventory and finished goods from point of origin to point of consumption have to be considered. Interconnected or interlinked networks, channels and node businesses are involved in the provision of products required by end customers in a supply chain along which goods flow.

Suppliers have difficulty in tracking status of their products put on sale by merchants that carry these products. Typically, there may be a significant delay before the information to replenish the products at the merchants is received by the suppliers' inventory management system, thereby resulting in unnecessarily long lead times for the products to be replenished. Consequently, this can lead to loss of revenue from the products that would otherwise be sold to potential customers during the product replenishment period.

There is thus a need to improve on the inventory management system used by the suppliers to track their products.

BRIEF DESCRIPTION

According to a first aspect of the disclosure, there is provided an inventory management server including at least one processor, and at least one memory including computer program code, the at least one memory and the computer program code configured to, with the at least one processor, cause the inventory management server at least to receive, from a payment network, tracking data assigned to a product, wherein the tracking data is transmitted by a merchant via a payment terminal in communication with the payment network, interrogate a mapping table containing assigned product to tracking data information, for presence of the received tracking data, update an inventory database of the product stocked at the merchant inventory in response to detection of presence of the received tracking data, and transmit acknowledgement data indicative of the inventory database update.

According to a second aspect of the disclosure, there is provided a non-transitory computer readable medium having stored thereon an application which when executed by an inventory management server causes the inventory management server to perform steps including receiving, from a payment network, tracking data assigned to a product, wherein the tracking data is transmitted by a merchant via a payment terminal in communication with the payment network, interrogating a mapping table containing assigned product to tracking data information, for presence of the received tracking data, updating an inventory database of the product stocked at the merchant inventory in response to detection of presence of the received tracking data, and transmitting acknowledgement data indicative of the inventory database update.

According to a third aspect of the disclosure, there is provided a merchant terminal for facilitating inventory management, the merchant terminal including a machine-readable tracking component reader, at least one processor, and at least one memory including computer program code, the at least one memory and the computer program code configured to, with the at least one processor, cause the merchant terminal at least to read, using the machine-readable tracking component reader, a machine-readable tracking component having stored thereon tracking data assigned to a product belonging to merchant inventory, transmit the tracking data to a payment network for routing to an inventory management server, and receive, from the payment network, acknowledgement data indicative of an inventory database update of the product stock at the merchant inventory.

According to a fourth aspect of the disclosure, there is provided a method for facilitating inventory management, the method including receiving, from a payment network, tracking data assigned to a product, wherein the tracking data is transmitted by a merchant via a payment terminal in communication with the payment network, interrogating a mapping table containing assigned product to tracking data information, for presence of the received tracking data, updating an inventory database of the product stocked at the merchant inventory in response to detection of presence of the received tracking data, and transmitting acknowledgement data indicative of the inventory database update.

BRIEF DESCRIPTION OF THE DRAWINGS

Embodiments of the disclosure will now be better understood and readily apparent to one of ordinary skill in the art from the following written description, by way of example only, and in conjunction with the drawings, wherein like reference signs relate to like components, in which.

DETAILED DESCRIPTION

Figure 1:
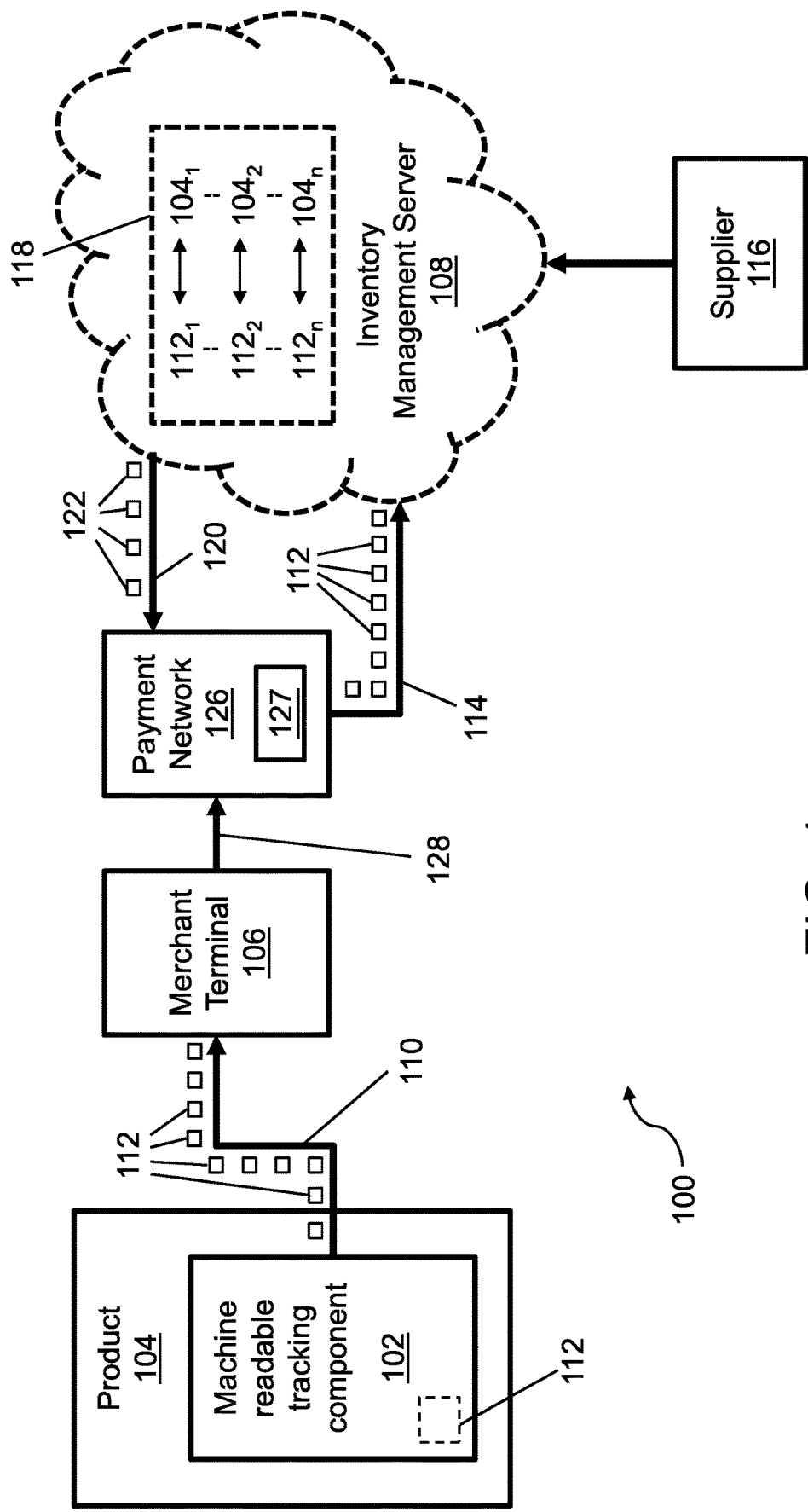
FIG. 1 shows a diagram illustrating an exemplary system for inventory management using an EMV chip in accordance with embodiments of the disclosure.

Embodiments of the present disclosure will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic, or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device. The computer system or similar electronic device manipulates and transforms data represented as physical quantities within the computer system into other data similarly represented as physical quantities within the computer system or other information storage, transmission, or display devices.

The present specification also discloses an apparatus for performing the operations of the methods disclosed herein. The apparatus may be specially constructed for the required purposes, or may include a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of a more specialized apparatus configured to perform the required method steps may be appropriate. The structure of a computer will appear from the description below.

In addition, the present specification also discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program, when loaded and executed on such a general-purpose computer, effectively results in an apparatus that implements the steps of the method described herein.

FIG. 1 shows a schematic diagram of a supply chain system 100 which includes a product 104, a merchant terminal 106, an inventory management server 108, and a supplier 116 of the product 104.

Product 104 may refer to any good or material suitable for inventory management, such as but not limited to, luxury-branded items including designer clothes, fashion accessories, watches, jewellery, precious metals, high-end consumer electronics, computers, computer accessories and components, telecommunications equipment, automotive parts, and/or pharmaceutical and medical devices.

The product 104 is provided with a machine-readable tracking component 102 such as an EMV (Europay, MasterCard and Visa) compliant chip, or other integrated circuit device capable of storing data which is readable by a payment terminal (for example, a payment terminal compatible with the EMV standard, if the machine-readable tracking component is an EMV-compliant chip), that is embedded in or applied to the product packaging. This machine-readable tracking component 102 may include an integrated circuit. The integrated circuit may have a microprocessor, interfaces, RAM and storage, which allows the machine-readable tracking component 102 to support wireless communication (such as RFID or NFC) with the data in the storage. The microprocessor runs an operating system having encryption and security features. In some embodiments, the machine-readable tracking component 102 may be a magnetic stripe storing such payment terminal-readable data applied to or incorporated into the product 104 packaging.

Tracking data 112 can be written into the machine-readable tracking component 102. This tracking data 112 refers to information that facilitates determining the inventory status of the product 104 to which the machine-readable tracking component 102 is tagged. The effect that the tracking data 112 has depends on the type of system that is reading the tracking data 112. For example, to a mapping table 118 at the inventory management server 108, it serves to identify the product 104 to which the tracking data 112 is assigned. The same tracking data 112, when read either wirelessly by, or through contact with, a payment terminal (by swiping, tapping or insertion), allows for an inventory to be updated, such as to reflect that the product 104 is removed from the inventory stock. In this manner, the tracking data 112 is used to facilitate inventory management of the product 104. Should contact be used to read the machine-readable tracking component 102, a portion of the machine-readable tracking component 102 is exposed from the product packaging, for access to a machine readable tracking component reader (such as an EMV chip reader when the machine-readable tracking component 102 is an EMV chip or a magnetic stripe reader when the machine-readable tracking component 102 is a magnetic stripe). The machine-readable tracking component 102 may also be programmed to have product data, such as a description of the product 104, its serial number and classification of the product 104.

In one embodiment, a PAN (personal account number) of the machine-readable tracking component 102 is used for the tracking data 112, especially when the machine-readable tracking component 102 is an EMV chip or a magnetic stripe used for payment cards (e.g. credit, debit or stored value cards). That is, to obtain the tracking data 112, the PAN of the machine-readable tracking component 102 is read with no need for additional data to be extracted from the machine-readable tracking component 102. A portion of the PAN (usually the first six digits or the BIN) of such a machine-readable tracking component 102 may belong to a range reserved to support the supply chain system 100, to facilitate routing of the tracking data 112 to the inventory management server 108. It is also possible to use a value derived from the PAN for the tracking data 112.

In another embodiment, the tracking data 112 is a separate value that is encoded into the machine-readable tracking component 102. This separate value may be encoded into the machine-readable tracking component 102 before the product 104, packaged with such a machine-readable tracking component 102, is supplied to the merchant. The separate value will be stored in the mapping table 118 at the inventory management server 108. When the separate value is read by the merchant terminal 106, it is transmitted with the PAN of the machine-readable tracking component 102, whereby the PAN is used to route the tracking data 112 through a payment network 126 to the inventory management server 108. At the inventory management server 108, a lookup at the mapping table 118 is performed using the received separate value.

The merchant terminal 106 may refer to a POS (point of sale) terminal that is operated by a merchant that carries the product 104. The POS terminal is a device that is typically used to interface with payment cards, such as credit cards, debit cards, and digital wallets. The merchant terminal 106 may also include a computer, a cash register, and other equipment that supports functions like inventory management and integration with a merchant backend system. The merchant terminal 106 is also configured to process information generated during purchase of the product 104. The information includes financial transaction data used to facilitate payment of the product 104, and data that is used in conjunction with the tracking data 112 for inventory management purposes.

The merchant terminal 106 may also include a NFC (Near Field Communication) transceiver and/or a RFID transceiver that receives and transmits data from digital wallets or receives data from payment cards. The NFC transceiver and the RFID transceiver are further configured to read 110 the machine-readable tracking component 102 to obtain the tracking data 112 and subsequently transmit 114 the tracking data 112 to the inventory management server 108 when the product 104 is sold by the merchant. When the machine-readable tracking component 102 is read, the terminal will transmit a pre-authorization request that initiates a pre-authorization transaction, by generating an ISO-8583 formatted authorization request message to route the tracking data 112 through the payment network 126, the ISO-8583 message being based on the BIN reserved for the supply chain system 100. Tracking data 112 is the identifier used to look up the inventory database, which (as explained above) may be the PAN of the machine-readable tracking component 102 (sent as DE 2 of the ISO-8583 message); or the digits of the PAN other than the first 6 digits (which are reserved for the BIN); or is the separate value encoded in the machine-readable tracking component 102. This tracking data 112 is used to populate one of the other data elements of the ISO 8583 message, such as DE 48 (private data element).

The payment network 126 refers to a single computing device or a network of interconnected computing devices used to realize, for example, the four party system operated by MasterCard®. The payment network 126 routes messages to the inventory management server 108 based on the BIN reserved for the supply chain system 100 and interprets the message at the inventory management server 108. The use of such a payment network 126, which includes a financial switching server 127 used by MasterCard® allows the inventory management server 108 to utilize communication channels for routing the tracking data 112. For the sake of simplicity, the payment network 126 is not further elaborated.

The inventory management server 108 refers to a single computing device or a network of interconnected computing devices which operate together to perform inventory management. The inventory management server 108 may include an inventory database that keeps records of the product 104 stocked at the merchant. The inventory management server 108 keeps such records by tracking the movement of the machine-readable tracking component 102 which is bundled with the product 104. For example, an entry is created inside the inventory database for tracking data 112 that is assigned to each product 104. When the product 104 is sent to the merchant, the location of the product 104 is updated accordingly in the inventory database. In this manner, the inventory management server 108 is aware of the merchant inventory in respect of the quantity of the product 104 from tracking that the product 104 has been sent to the merchant and also from receiving the tracking data 112 transmitted 114 by the merchant terminal 106. Accordingly, the merchant inventory does not necessarily have to be synchronized with the inventory database of the inventory management server 108 to manage stock of the product 104 kept at the merchant.

In one implementation, the inventory management server 108 is hosted by a supplier of the product 104, so that the supply chain system 100 does not require the inclusion of the supplier 116 of the product 104. In an alternative embodiment, where the supply chain system 100 includes the supplier 116 of the product 104, the inventory management server 108 is then in communication with the merchant and the supplier 116 of the product to the merchant. The inventory management server 108 is then hosted by a facilitator that manages the inventory of the product 104. In this alternative embodiment, the inventory management server 108 keeps track of the product 104 provided by the supplier 116 by, for example, generating or issuing tracking data 112 that will be assigned to each product 104 that the supplier 116 provides to the inventory management server 108. As described above, this tracking data 112 may be a PAN of the machine-readable tracking component 102, a value derived from the PAN or a separate value encoded into the machine-readable tracking component 102. The inventory management server 108 may then write the tracking data into the machine-readable tracking component 102 for packaging with the product 104. If the product 104 provided by the supplier 116 does not include the machine-readable tracking component 102, the facilitator hosting the inventory management server 108 undertakes bundling the product 104 with the machine-readable tracking component 102. Accordingly, in this alternative implementation, the inventory management server 108 may interface with a plurality of suppliers 116 and inventory for the merchant in respect of the product 104 being provided by one or more of this plurality of suppliers 116.

The advantage of having inventory of the product 104 managed by the inventory management server 108 is that it allows more efficient supply chain management of the product 104, as opposed to having the merchant directly manage the inventory of the product 104. For example, if the quantity of the product 104 stock falls beneath a threshold level, the inventory management server 108 can effect replenishment of the product 104 at the merchant. This replenishment may be effected by, for example, automatically initiating an acquisition process where an order is placed with the supplier 116 for the product 104. If the inventory management server 108 is hosted by a supplier of the product 104, the inventory management server 108 can initiate a sequence which brings about the inventory management server 108 directly providing the product 104 to the merchant.

One possible approach in which the supply chain system 100 facilitates inventory management is described below with reference to FIG. 1.

The product 104 is brought to the merchant terminal 106 during check-out. The merchant terminal 106 will read 110 the tracking data 112 from the machine-readable tracking component 102, for routing 128 through the payment network 126 to the inventory management server 108, and also to remove the product 104 from the merchant inventory. If this check out is the result of sale of the product 104, the merchant terminal will also initiate a payment sequence for the product 104. Alternatively, if the check out is due to the product 104 being moved to another branch that belongs to a merchant, there will be no initiation of such a payment sequence.

This tracking data 112 assigned to the product 104 is received 114 by the inventory management server 108 from the payment network 126. The tracking data 112 is then used to interrogate a mapping table 118 for presence of the received tracking data 112, i.e. it is determined whether the mapping table 118 contains a matching entry for the tracking data 112. The mapping table contains assigned product to tracking data information, whereby this information is one or more record entries, each being a paired item (1121 ↔ 1041; 1122 ↔ 1042 and 112n ↔ 104n) of tracking data and a product against which the tracking data is applied.

In response to detecting that the received tracking data 112 is stored in the mapping table, an inventory database (not shown) of the product stocked at the merchant inventory is updated. This update involves reflecting in the inventory database of the decrease in the quantity of the product stocked at the merchant. Acknowledgement data 122 indicative of the inventory database update, i.e. an acknowledgement that the inventory database has been duly updated, is then transmitted 120 to the merchant terminal 106, by being routed through the payment network 126.

FIG. 1 illustrates that the mapping table 118 is hosted within the inventory management server 108. The inventory database can also be hosted within the inventory management server 108. Alternatively, one or more of the inventory database and the mapping table may be externally hosted (not shown).

The inventory management server 108 may also additionally determine whether the quantity of the product 104 stocked at the merchant inventory falls below a threshold level, for example, by monitoring records of the product 104 stocked in the inventory database. Upon determining that the product 104 quantity falls below the threshold level, the inventory management server 108 flags for replenishment of the product 104 stocked at the merchant inventory. The flagging for replenishment of the product 104 stocked at the merchant inventory may comprise effecting resupply of the product 104 at the merchant. This resupply may come about from the above mentioned initiation of the acquisition process or the above mentioned sequence of the inventory management server 108 directly providing the product 104 to the merchant. The inventory management server 108 may then initiate a transaction sequence to bill the merchant for the replenished product stock.

The tracking data 112 may also be made unique by associating it with data belonging to a range reserved for the tracking data 112. For instance, the machine-readable tracking component 102, from which the tracking data 112 is read, typically can be configured to belong to a reserved BIN (Banking Identification Number) or PAN (Personal Account Number) range, which is unutilized for payment activities. The tracking data 112 can then be read 112 together with this BIN or PAN data, and both routed through the supply chain system 100 when performing inventory management. Such association also enhances the secureness of the tracking data 112, since such BIN or PAN data is communicated over secure channels using multiple layers of encryption.

Within the mapping table 118, merchant identification information may be linked to each set (1121↔1041; 1122↔1042 and 112n↔104n) of assigned product to tracking data information. Such merchant identification information includes data, such as a merchant code, which serves to identify the merchant that is carrying the product 104. By also pairing merchant identification information with the assigned product to tracking data information, the inventory management server 108 is provided with an additional set of parameters to ensure that the correct inventory database is updated when there is movement of the product 104 at the merchant. When the inventory management server 108 receives the tracking data 112, the inventory management server 108 is further configured to detect whether merchant data, identifying the merchant from which the tracking data 112 is transmitted, accompanies the tracking data 112. Before updating the inventory database, the inventory management server 108 ascertains, for a set of assigned product to tracking data information that matches the received tracking data, that the merchant identification information tallies with the received merchant data.

The mapping table 118 may be constructed from information received from external sources, especially if the inventory management server 108 is a facilitator in communication with the merchant and a supplier 116 of the product 104 to the merchant. In such an implementation, the mapping table 118 may receive, from one or more suppliers 116 of the product 104, data on the product and its assigned tracking data. The mapping table 118 will then provide the linkage between the product 104 and its assigned tracking data by mapping the product data to the assigned tracking data. In another implementation, the supplier 116 may only provide the product 104, whereby the inventory management server 108 undertakes the role of generating the tracking data 112 and assigning it to the product 104 by packaging the product 104 with the machine-readable tracking component 102 with the tracking data 112 embedded. The inventory management server 108 may also be responsible for embedding the product data into the machine-readable tracking component 102. Alternatively, one or more of the generation of the tracking data 112, the embedding of the tracking data 112 into the machine-readable tracking component 102 and the embedding of the product data into the machine-readable tracking component 102 is performed by an issuer or provider of the machine-readable tracking component 102.

Figure 2:
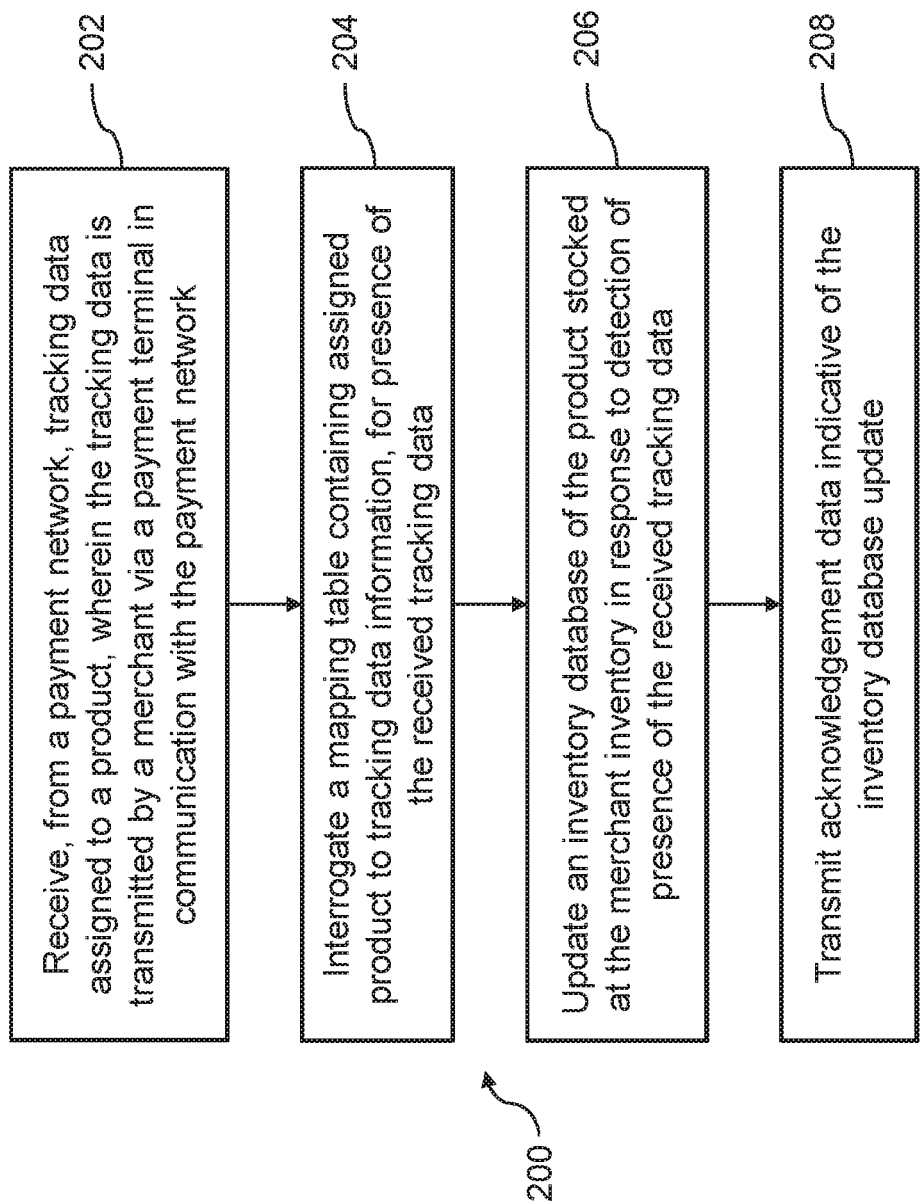
FIG. 2 shows a flowchart of a method for inventory management implemented in the system shown in FIG. 1.

FIG. 2 shows steps of a method 200 which facilitates inventory management, the method 200 being implemented in the supply chain system 100 shown in FIG. 1.

In step 202, tracking data assigned to a product is received, wherein the tracking data is transmitted by a merchant via a payment terminal in communication with the payment network.

In step 204, a mapping table containing assigned product to tracking data information is interrogated for presence of the received tracking data.

In step 206, an inventory database of the product stocked at the merchant inventory is updated, in response to detection of presence of the received tracking data.

In step 208, acknowledgement data indicative of the inventory database update is transmitted.

Figure 3:
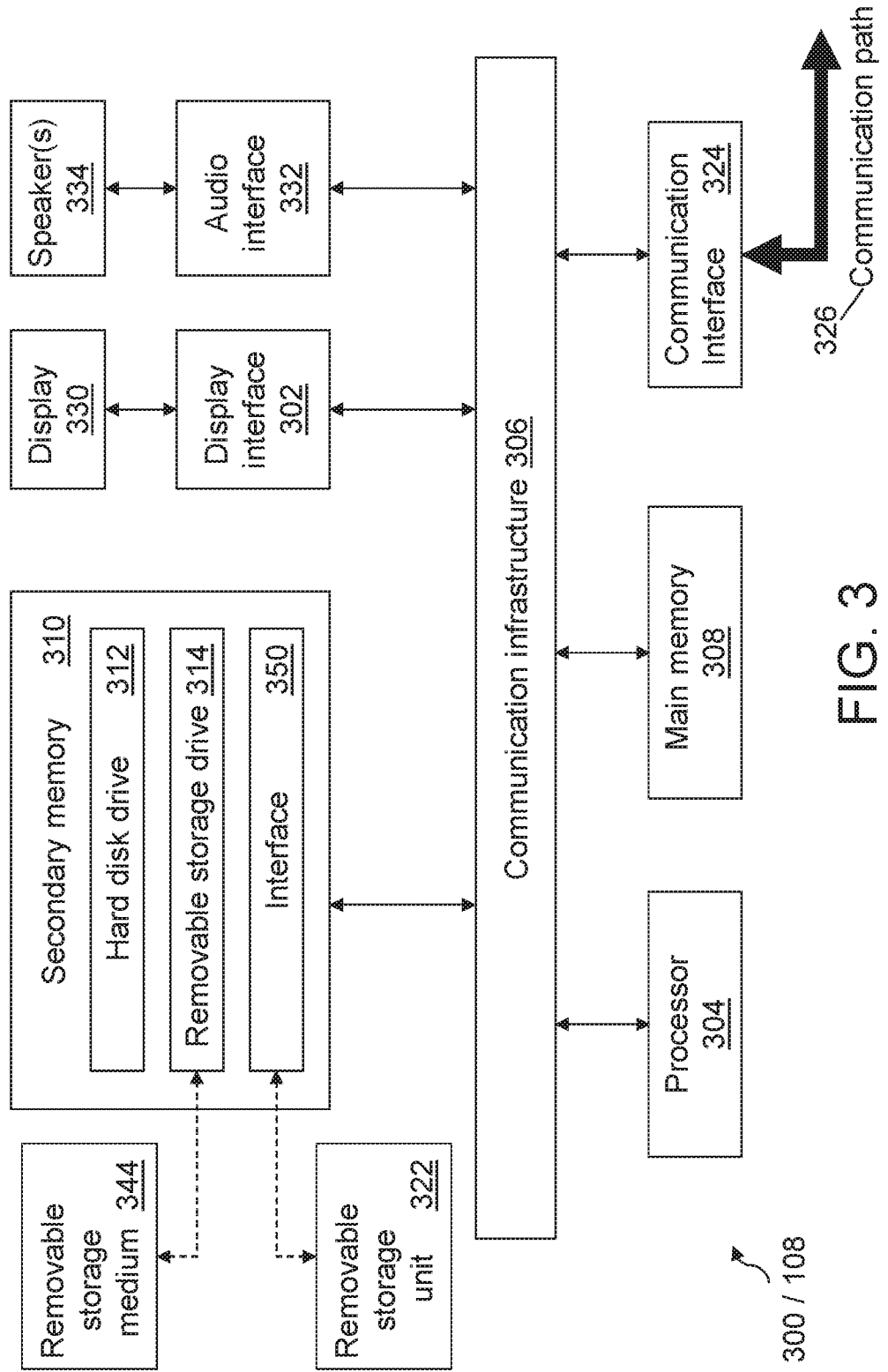
FIG. 3 is a schematic diagram of a computing device that may be utilized to implement an inventory management server used in the inventory management system shown in FIG. 1.

The method may further include the steps (not shown) of determining whether the quantity of the product stocked at the merchant inventory falls below a threshold level, and flagging for replenishment of the product stocked at the merchant inventory upon the product quantity falling below the threshold level. Flagging for replenishment of the product stocked comprises effecting resupply of the product at the merchant. The tracking data may comprise a PAN tagged with the product or a value derived from the PAN. The PAN may be obtained from a machine readable tracking component packaged with the product FIG. 3 shows an exemplary computing device 300 that can be used to implement the inventory management server 108 shown in FIG. 1. The computing device includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 344 in a well-known manner. The removable storage medium 344 may include magnetic tape, optical disk, non-volatile memory storage medium, or the like, which is read by and written to by removable storage drive 314. As will be appreciated by persons skilled in the relevant art(s), the removable storage medium 344 includes a non-transitory or transitory computer readable storage medium having stored therein computer executable program code instructions and/or data.

In an alternative embodiment, the secondary memory 310 may additionally or alternatively include other similar means for allowing computer programs or other instructions to be loaded into the computing device 300. Such means can include, for example, a removable storage unit 322 and an interface 330. Examples of a removable storage unit 322 and interface 330 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 330 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port (such as a serial, parallel, printer, GPIB, IEEE 1394, RJ45, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage medium 344, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 300 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the storage drive 312, or the interface 330. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example to explain the operation and structure of the inventory management server 108. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

The main memory 308 and the secondary memory 310 contain computer program code that configures the processor 304 to cause the inventory management server 108 to receive, from a payment network 126, tracking data assigned to a product, wherein the tracking data is transmitted by a merchant via a payment terminal in communication with the payment network 126. The inventory management server 108 is further configured to interrogate a mapping table containing assigned product to tracking data information, for presence of the received tracking data, update an inventory database of the product stocked at the merchant inventory in response to detection of presence of the received tracking data, and transmit acknowledgement data indicative of the inventory database update.

At least one of the removable storage medium 344, the removable storage unit 322, and the hard disk drive 312 provide a non-transitory computer readable medium having stored thereon an application which when executed by the inventory management server 108 causes the inventory management server 108 to perform the steps described herein. The steps include (a) receiving, from a payment network, tracking data assigned to a product, wherein the tracking data is transmitted by a merchant via a payment terminal in communication with the payment network, (b) interrogating a mapping table containing assigned product to tracking data information, for presence of the received tracking data, (c) updating an inventory database of the product stocked at the merchant inventory in response to detection of presence of the received tracking data, and (d) transmitting acknowledgement data indicative of the inventory database update.

Figure 4:
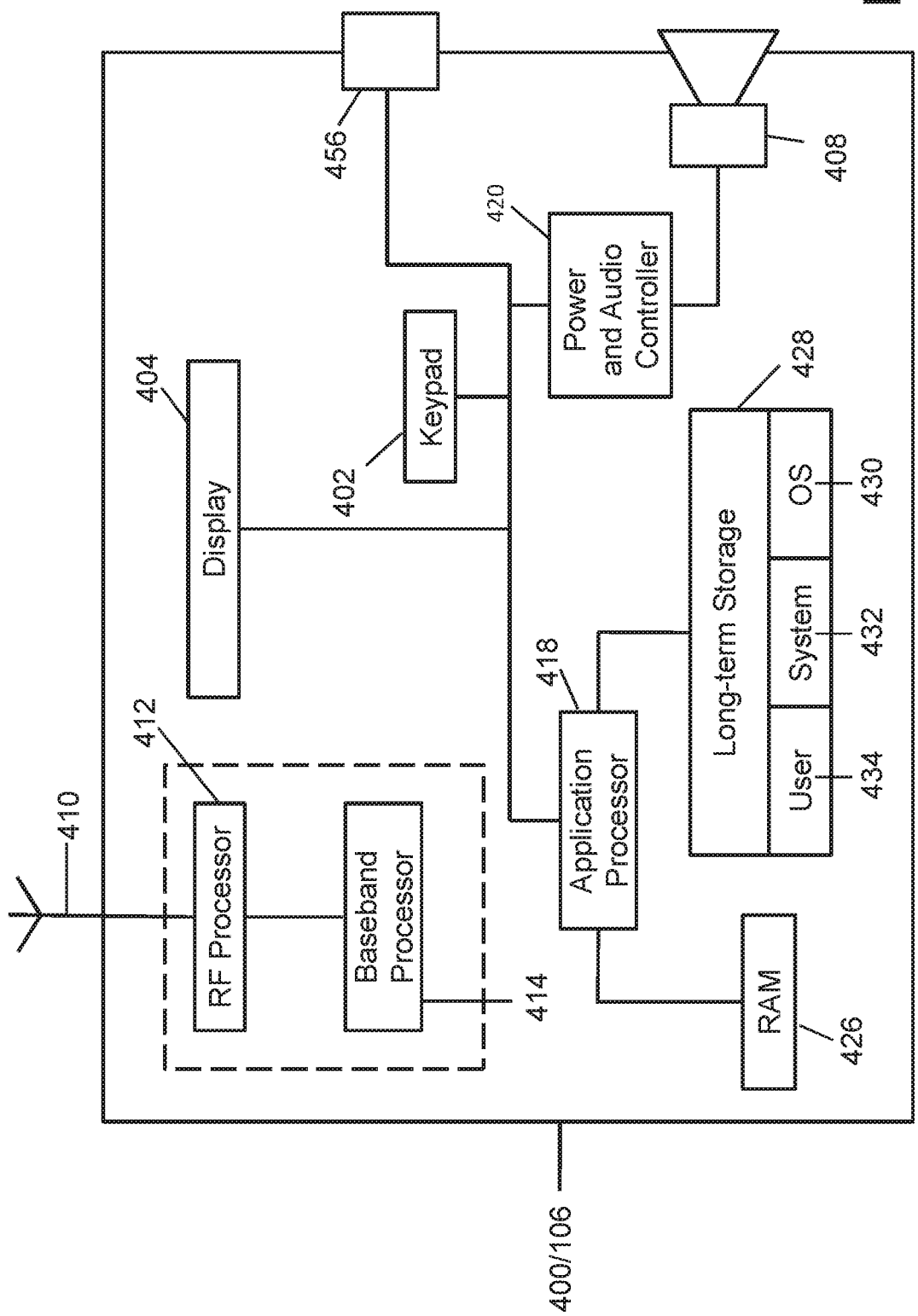
FIG. 4 is a schematic diagram of a computing device that may be utilized to implement a merchant terminal shown in the inventory management system shown in FIG. 1.

FIG. 4 is a schematic diagram of a computing device 400 that may be utilized to implement the merchant terminal 106 shown in FIG. 1.

The computing device 400 includes a keypad 402, a display 404, a speaker 408, and an antenna 410. Communication hardware that is used to enable NFC or RFID communication with the machine-readable tracking component 102 is represented by RF processor 412 which provides an RF signal to the antenna 410 for the transmission of data signals, and the receipt therefrom. Additionally provided is a baseband processor 414, which provides signals to and receives signals from the RF Processor 412.

The keypad 402 and the display 404 are controlled by an application processor 418. The display 404 is used to provide an indication of the status of the merchant terminal 106, such as payment options available when the merchant terminal 106 detects that it is being used to receive electronic payment or that the merchant terminal 106 is processing payment after a payment option is selected through the keypad 402. The display 404 also shows the status of the merchant terminal 106 processing the tracking data 112. A power and audio controller 420 is provided to supply power to the RF processor 412 and the baseband processor 414, the application processor 418, and other hardware. The power and audio controller 420 also controls audio output via the speaker 408. The speaker 408 is used to provide sounds to indicate that a data transaction with the merchant terminal 106 has been successfully completed.

In order for the application processor 418 to operate, various different types of memory are provided. Firstly, the computing device 400 includes Random Access Memory (RAM) 426 connected to the application processor 418 into which data and program code can be written and read from at will. Code placed anywhere in RAM 426 can be executed by the application processor 418 from the RAM 426. RAM 426 represents a volatile memory of the computing device 400.

Secondly, the computing device 400 is provided with a long-term storage 428 connected to the application processor 418. The long-term storage 428 includes three partitions: an operating system (OS) partition 430, a system partition 432 and a user partition 434. The long-term storage 428 represents a non-volatile memory of the computing device 400.

In the present example, the OS partition 430 contains the firmware of the computing device 400 which includes an operating system. Other computer programs may also be stored on the long-term storage 428, such as application programs, and the like. In particular, application programs which are mandatory to the computing device 400 are typically stored in the system partition 432. The application programs stored on the system partition 432 would typically be those which are bundled with the computing device 400 by the device manufacturer when the computing device 400 is first sold. Application programs which are added to the computing device 400 by the user would usually be stored in the user partition 434.

The computing device 400 may also have a machine-readable tracking component reader 456 for reading the tracking data 112.

Either of the long-term storage 428 or the RAM 426 provides memory that contains computer program code that configures the application processor 418 to cause the merchant terminal 106 to detect, using the reader 456, a machine-readable tracking component (confer the machine-readable tracking component 102 of FIG. 1) having stored thereon tracking data assigned to a product belonging to merchant inventory. The merchant terminal 106 is further configured to transmit the tracking data to a payment network (confer the payment network 126 of FIG. 1) and receive, from the payment network, acknowledgement data indicative of an inventory database update of the product stock at the merchant inventory.

The merchant is further configured to transmit a pre-authorization request to route the tracking data through the payment network, wherein the acknowledgement data is further indicate of an approval of the pre-authorization request.

It will be appreciated by a person skilled in the art that numerous variations and/or modifications may be made to the present invention as shown in the specific embodiments without departing from the scope of the appended claims as broadly described. The present embodiments are, therefore, to be considered in all respects to be illustrative and not restrictive.

What is claimed is:

1. An inventory management server comprising:
   at least one processor; and
   at least one memory including computer program code configured to cause the inventory management server to:
   receive, from a financial switching server of a payment network, tracking data assigned to a product stocked at a merchant inventory associated with a merchant, wherein the tracking data is transmitted over the payment network by the merchant via a merchant terminal that is in communication with the financial switching server of the payment network in a pre-authorization request message generated prior to a purchase authorization request message being generated, the tracking data including a bank identification number (BIN) reserved for the inventory management server, the BIN identifying the inventory management server to the financial switching server for routing of the pre-authorization message to the inventory management server;

interrogate a mapping table containing product data associated with tracking data information for a presence of the received tracking data;

update an inventory database of the product stocked at the merchant inventory in response to detection of the presence of the received tracking data; and transmit, to the merchant terminal over the payment network in response to the pre-authorization request message, acknowledgement data indicative of the inventory database update.

2. The inventory management server according to claim 1, wherein the inventory management server is further configured to:

determine whether a quantity of the product stocked at the merchant inventory falls below a threshold level; and flag for replenishment of the product stocked at the merchant inventory upon the product quantity falling below the threshold level.

3. The inventory management server according to claim 1, wherein the inventory management server is further configured to:

ascertain that the received tracking data is accompanied with data belonging to a range reserved for the received tracking data.

4. The inventory management server according to claim 1, wherein the mapping table further contains merchant identification information linked to each set of the product data to the tracking data information, and Wherein the inventory management server is further configured to:

detect merchant data identifying the merchant from which the tracking data is transmitted, the merchant data being received with the tracking data; and ascertain, before updating the inventory database, a set of the product data to the tracking data information that matches the received tracking data, the set of the product data linked to the merchant identification information that tallies with the received merchant data.

5. The inventory management server according to claim 1, wherein the mapping table is configured to:

receive, from one or more suppliers of the product, data on the product and its assigned tracking data; and map the data to the assigned tracking data.

6. The inventory management server according to claim 1, wherein the inventory management server is further configured to:

generate the tracking data; and write the tracking data into a machine-readable tracking component for packaging with the product.

7. The inventory management server according to claim 6, wherein the machine-readable tracking component comprises at least one of an EMV chip, an integrated circuit, and a magnetic stripe.

8. The inventory management server according to claim 6, wherein the inventory management server is further configured to embed the product data into the machine-readable tracking component.

9. The inventory management server according to claim 8, wherein at least one of the generation of the tracking data, the writing of the tracking data into the machine-readable tracking component, and the embedding of the product data into the machine-readable tracking component is performed by an issuer of the machine-readable tracking component.

10. The inventory management server according to claim 2, wherein the inventory management server is further configured to:

initiate a transaction sequence to bill the merchant for the replenishment of the product stocked.

11. The inventory management server according to claim 1, wherein at least one of the mapping table and the inventory database is externally hosted.

12. The inventory management server according to claim 1, wherein the inventory management server is hosted by a supplier of the product to the merchant.

13. The inventory management server according to claim 1, wherein the inventory management server is hosted by a facilitator in communication with the merchant and a supplier of the product to the merchant.

14. The inventory management server according to claim 2, wherein to flag for replenishment of the product stocked, the inventory management server is configured to flag for replenishment to effect resupply of the product at the merchant.

15. The inventory management server according to claim 6, wherein the tracking data comprises at least one of a PAN tagged with the product, a value derived from the PAN, and a separate value encoded into the machine-readable tracking component.

16. The inventory management server according to claim 15, wherein the PAN is obtained from the machine-readable tracking component packaged with the product.

17. A non-transitory computer readable medium having stored thereon an application, which when executed by an inventory management server, causes the inventory management server to perform steps comprising:

receiving, from a financial switching server of a payment network, tracking data assigned to a product stocked at a merchant inventory associated with a merchant, wherein the tracking data is transmitted over the payment network by the merchant via a merchant terminal that is in communication with the financial switching server of the payment network in a pre-authorization request message generated prior to a purchase authorization request message being generated, the tracking data including a bank identification number (BIN) reserved for the inventory management server, the BIN identifying the inventory management server to the financial switching server for routing of the pre-authorization message to the inventory management server;

interrogating a mapping table containing product data associated with tracking data information for a presence of the received tracking data;

updating an inventory database of the product stocked at the merchant inventory in response to detection of the presence of the received tracking data; and transmitting, to the merchant terminal over the payment network in response to the pre-authorization request message, acknowledgement data indicative of the inventory database update.

18. A method for facilitating inventory management, the method comprising:

receiving, from a financial switching server of a payment network, tracking data assigned to a product stocked at a merchant inventory associated with a merchant, wherein the tracking data is transmitted over the payment network by the merchant via a merchant terminal that is in communication with the financial switching server of the payment network in a pre-authorization request message generated prior to a purchase authorization request message b generated, the tracking data including a bank identification number (BIN) reserved for the inventory management server, the BIN identifying the inventory management server to the financial switching server for routing of the pre-authorization message to the inventory management server;

interrogating a mapping table containing product data associated with tracking data information for a presence of the received tracking data;

updating an inventory database of the product stocked at the merchant inventory in response to detection of the presence of the received tracking data; and transmitting, to the merchant terminal over the payment network in response to the pre-authorization request message, acknowledgement data indicative of the inventory database update.

19. The method according to claim 18, wherein the tracking data comprises at least one of a PAN tagged with the product and a value derived from the PAN.

20. The method according to claim 19, wherein the PAN is obtained from a machine-readable tracking component packaged with the product.

* * * * *